(12) United States Patent
Takezawa

(10) Patent No.: US 7,736,808 B2
(45) Date of Patent: Jun. 15, 2010

(54) NON-AQUEOUS ELECTROLYTE SECONDARY BATTERY

(75) Inventor: Hideharu Takezawa, Nara (JP)

(73) Assignee: Panasonic Corporation, Osaka (JP)

( * ) Notice: Subject to any disclaimer, the term of this patent is extended or adjusted under 35 U.S.C. 154(b) by 6 days.

(21) Appl. No.: 12/162,876

(22) PCT Filed: Jan. 26, 2007

(86) PCT No.: PCT/JP2007/051233

§ 371 (c)(1),
(2), (4) Date: Jul. 31, 2008

(87) PCT Pub. No.: WO2007/088781

PCT Pub. Date: Aug. 9, 2007

(65) Prior Publication Data

US 2009/0017375 A1    Jan. 15, 2009

(30) Foreign Application Priority Data

Jan. 31, 2006  (JP) .............................. 2006-022113

(51) Int. Cl.
*H01M 4/58* (2010.01)
(52) U.S. Cl. ................. 429/231.8; 429/218.1; 429/221; 429/223; 429/231.5; 429/232; 429/231.95; 427/58; 427/122
(58) Field of Classification Search ............ 429/218.1, 429/221, 223, 231.5, 231.8, 232, 231.95; 427/58, 122
See application file for complete search history.

(56) References Cited

U.S. PATENT DOCUMENTS

2007/0099081 A1* 5/2007 Matsuda et al. ............. 429/232
2008/0160409 A1* 7/2008 Ishida et al. ................ 429/221

FOREIGN PATENT DOCUMENTS

| JP | 2002-367602 | 12/2002 |
|---|---|---|
| JP | 2002-373653 | 12/2002 |
| JP | 2003-45488 | 2/2003 |
| JP | 2004-296186 | 10/2004 |
| JP | 2004-349056 | 12/2004 |
| JP | 2005-79057 | 3/2005 |
| JP | 2005-353758 | 12/2005 |

OTHER PUBLICATIONS

Sakaguchi, H., "Tanso no Tsugi o Ukagau Fukyoku Zairyo 'Kinzokukan Kagobutsu'", Chemistry, Apr. 1, 2000, p. 60-61, vol. 55, No. 4.
Shu, J., et al., "Cage-like carbon nanotubes/Si composite as anode material for lithium ion batteries," Electrochemistry Communications, 2006, p. 51-54, vol. 8, Elsevier B.V.

* cited by examiner

*Primary Examiner*—Laura S Weiner
(74) *Attorney, Agent, or Firm*—McDermott Will & Emery LLP

(57) ABSTRACT

A non-aqueous electrolyte secondary battery of the present invention includes a positive electrode including a positive electrode material mixture, a negative electrode including a negative electrode material mixture, and a non-aqueous electrolyte including a non-aqueous solvent and a first lithium salt and a second lithium salt dissolved in the non-aqueous solvent. The negative electrode material mixture includes a material capable of absorbing and desorbing lithium ions, and carbon nanofibers. The material capable of absorbing and desorbing lithium ions has a ratio A/B of a volume A in a charged state to a volume B in a discharged state of 1.2 or more. The first lithium salt is at least one selected from the group consisting of $LiBF_4$ and $LiB(C_2O_4)_2$. The second lithium salt is a salt other than the first lithium salt. The first lithium salt is included in the non-aqueous electrolyte at a weight ratio of $10^{-4}$ or more relative to the carbon nanofibers. The first lithium salt included in the non-aqueous electrolyte has a concentration of 0.05 $mol/dm^3$ or less.

4 Claims, 1 Drawing Sheet

NON-AQUEOUS ELECTROLYTE SECONDARY BATTERY

RELATED APPLICATIONS

This application is the U.S. National Phase under 35 U.S.C. §371 of International Application No. PCT/JP2007/051233, filed on Jan. 26, 2007, which in turn claims the benefit of Japanese Application No. 2006-022113, filed on Jan. 31, 2006, the disclosures of which Applications are incorporated by reference herein.

TECHNICAL FIELD

The present invention relates to non-aqueous electrolyte secondary batteries and more particularly to improvement of negative electrodes and non-aqueous electrolytes.

BACKGROUND ART

Negative electrode active materials such as silicon are expected to have higher capacities than carbon materials such as graphite. However, such negative electrode active materials undergo significant changes in volume during charge and discharge. In association with these significant changes in volume, the current-collecting abilities of negative electrodes are reduced, and thus the cycle characteristics are deteriorated.

In order to improve the current-collecting ability, a proposal has been made to mechanically coat the surface of silicon oxide particles with a carbon material (see Patent Document 1), and another proposal has been made to form carbon fibers on the surface of an active material core containing a metal or semimetal capable of forming a lithium alloy, for example, by a CVD method (see Patent Document 2).

Further, in order to inhibit the side reaction between the negative electrode active material and the non-aqueous electrolyte, a proposal has been made to add $LiBF_4$ to the non-aqueous electrolyte (see Patent Document 3), and another proposal has been made to add $LiB(C_xH_{2(x-2)}O_4)(C_yH_{2(y-2)}O_4)$ and $LiBF_4$ to the non-aqueous electrolyte (see Patent Document 4).

Patent Document 1: Japanese Laid-Open Patent Publication No. 2002-373653
Patent Document 2: Japanese Laid-Open Patent Publication No. 2004-349056
Patent Document 3: Japanese Laid-Open Patent Publication No. 2003-45488
Patent Document 4: Japanese Laid-Open Patent Publication No. 2005-79057

DISCLOSURE OF THE INVENTION

Problem to be Solved by the Invention

The present inventors have found through examination that in the case of using a negative electrode active material in which the ratio of the volume in a charged state to the volume in a discharged state is 1.1 or less, which is exemplified by a carbon material such as graphite, the deterioration in cycle characteristics is suppressed by using the foregoing techniques disclosed in Patent Documents 1 and 2. However, in the case of using a negative electrode active material in which the ratio of the volume in a charged state to the volume in a discharged state is 1.2 or more, the cycle characteristics are not sufficiently improved by using the disclosed amount of carbon material or carbon fibers.

In order to maintain the current-collecting ability among active material particles that undergo significant changes in volume, in view of increasing the contact points among the active material particles, it is considered effective, for example, to increase the containing ratio of a conductive agent having a small fiber diameter, such as of carbon nanofibers, in a negative electrode material mixture. However, the carbon nanofibers have a very large specific surface area (100 to 200 m$^2$/g). Therefore, during charge in which the negative electrode is exposed to an extremely negative potential, the side reaction between the negative electrode active material and the non-aqueous electrolyte is facilitated as compared with in the case of using conventional conductive agents, allowing a coating membrane derived from a non-aqueous solvent to be formed as a reaction product on the surface of the carbon nanofibers. As a result, the charge-discharge efficiency is reduced.

In addition, carbon fibers, because of their large fiber diameter, straight shape, and rigidity, are not capable of exerting a function of relieving the stress produced during expansion of the negative electrode active material when included in the electrode. On the other hand, the carbon nanofibers have a small fiber diameter and are entangled with one another. As such, space is created between the carbon nanofibers by the entanglement. The space and the elasticity of the carbon nanofibers themselves allow the carbon nanofibers to exert a function of relieving the stress produced during expansion of the negative electrode active material. This can prevent a reduction in the current-collecting ability among negative electrode active material particles and/or between the negative electrode active material and the negative electrode current collector due to a deformation or decomposition of the negative electrode. However, the coating membrane formed by the side reaction between the carbon nanofibers and the non-aqueous electrolyte fill the space that would otherwise function effectively in relieving the stress, depriving the carbon nanofibers of their unique function of stress absorption and restoration. As a result, the current-collecting ability cannot be maintained and thus the cycle characteristics are deteriorated.

As described above, in the case of using a negative electrode active material having a large volume expansion rate, even when the ratio of the carbon nanofibers included in the negative electrode is increased, the cycle characteristics of the battery cannot be sufficiently improved.

Means for Solving the Problem

The present invention relates to a non-aqueous electrolyte secondary battery including a positive electrode including a positive electrode material mixture; a negative electrode including a negative electrode material mixture; and a non-aqueous electrolyte including a non-aqueous solvent, and a first lithium salt and a second lithium salt dissolved in the non-aqueous solvent, wherein the negative electrode material mixture includes a material capable of absorbing and desorbing lithium ions, and carbon nanofibers, the material capable of absorbing and desorbing lithium ions has a ratio A/B of a volume A in a charged state to a volume B in a discharged state of 1.2 or more, the first lithium salt is at least one selected from the group consisting of $LiBF_4$ and $LiB(C_2O_4)_2$, the second lithium salt is a salt other than the first lithium salt, the first lithium salt is included in the non-aqueous electrolyte at a weight ratio of $10^{-4}$ or more relative to the carbon nanofibers, and the first lithium salt included in the non-aqueous electrolyte has a concentration of 0.05 mol/dm$^3$ or less.

The charged state as used herein means a state in which lithium ions are electrochemically absorbed in the material capable of absorbing and desorbing lithium ions; and the discharged state as used herein means a state in which lithium ions are electrochemically desorbed from the material capable of absorbing and desorbing lithium ions. When defined in terms of potential, the charged state means a state in which the potential of the negative electrode is 100 mV or less versus Li/Li$^+$; and the discharged state means a state in which the potential of the negative electrode is 400 mV or more versus Li/Li$^+$.

The potential of a negative electrode can be determined, for example, in the following manner. Batteries in the charged state and in the discharged state are disassembled and the negative electrodes in the charged state and in the discharged state are taken out therefrom. The open-circuit potentials of the negative electrodes in the charged state and in the discharged state are measured by using a non-aqueous electrolyte prepared for this measurement and Li metal as a reference electrode, whereby the potentials of the negative electrodes in the charged state and in the discharged state can be determined.

The volumes of a material capable of absorbing and desorbing lithium ions in the charged state and the discharged state can be determined, for example, in the following manner. Batteries in the charged state and in the discharged state are disassembled, and the negative electrodes in the charged state and in the discharged state are taken out therefrom. In each of the negative electrodes, the size of 20 to 100 particles of the above-described material is measured with a scanning electron microscope (SEM) to determine a mean particle size of these. From the mean particle sizes in the charged state and in the discharged state, the volumes of the above-described material in the charged state and the discharged state can be determined.

In the foregoing non-aqueous electrolyte secondary battery, it is preferable that the carbon nanofibers are carried on a surface of the material capable of absorbing and desorbing lithium ions, and a catalyst for promoting a growth of the carbon nanofibers is also carried on the surface of the material capable of absorbing and desorbing lithium ions. It is preferable that the ratio of the carbon nanofibers to a total of the carbon nanofibers, the material capable of absorbing and desorbing lithium ions, and the catalyst is 10 to 50% by weight.

In the foregoing non-aqueous electrolyte secondary battery, it is preferable that the material capable of absorbing and desorbing lithium ions contains at least one element selected from the group consisting of Si and Sn.

Effect of the Invention

In the present invention, the negative electrode material mixture includes carbon nanofibers. Further, the non-aqueous electrolyte contains at least one first lithium salt selected from the group consisting of LiBF$_4$ and LiB(C$_2$O$_4$)$_2$. Because of the inclusion of the first lithium salt in the non-aqueous electrolyte, a protective membrane derived from the first lithium salt is formed on the surface of the carbon nanofibers. This inhibits a coating membrane derived from a constituent component of the non-aqueous electrolyte, such as the non-aqueous solvent, from being formed on the surface of the carbon nanofibers during charge, allowing the space created by the entanglement of the carbon nanofibers to be left unimpaired. This maintains the current-collecting ability among negative electrode active material particles and the current-collecting ability between the negative electrode active material and the negative electrode current collector during charge-discharge cycling. It is possible, therefore, to provide a non-aqueous electrolyte secondary battery having a high capacity and being excellent in cycle characteristics.

BEST MODE FOR CARRYING OUT THE INVENTION

Figure 1:
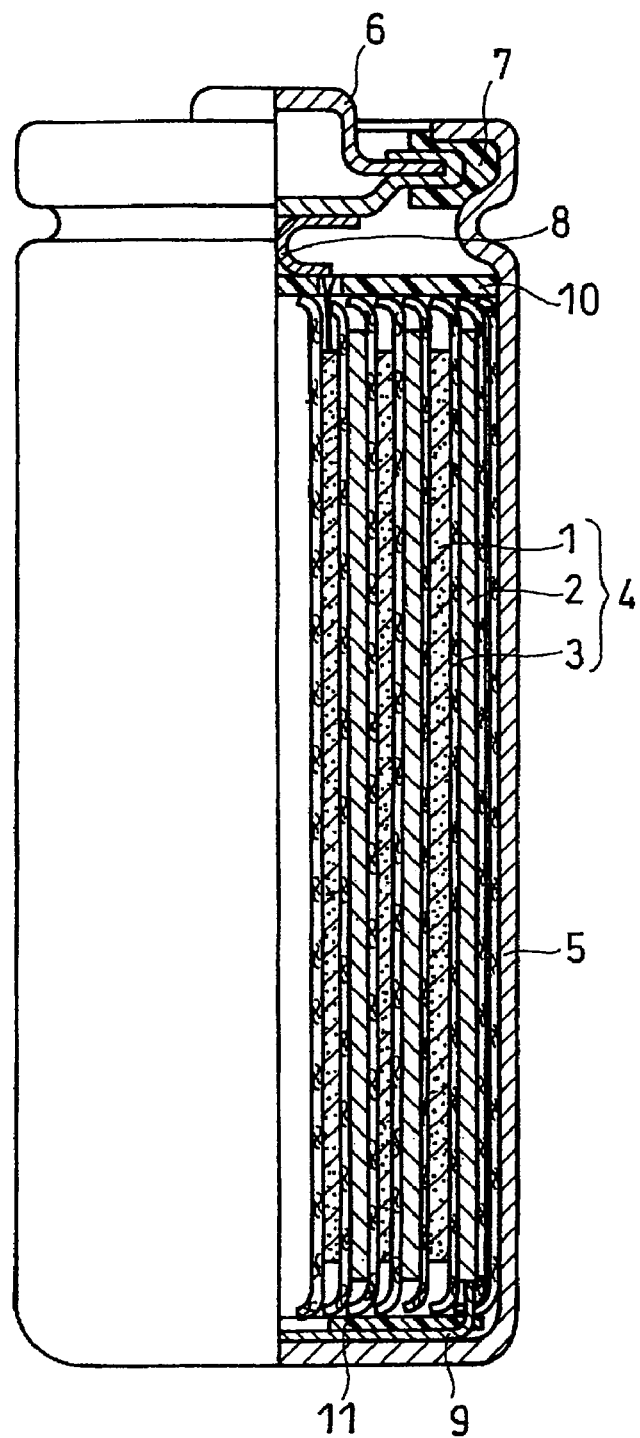
FIG. 1 A schematic longitudinal cross-sectional view illustrating a cylindrical battery fabricated in Examples.

The present invention is described below in detail.

The non-aqueous electrolyte secondary battery of the present invention includes a positive electrode including a positive electrode material mixture; a negative electrode including a negative electrode material mixture; and a non-aqueous electrolyte including a non-aqueous solvent, and a first lithium salt and a second lithium salt dissolved in the non-aqueous solvent. The negative electrode material mixture includes a material capable of absorbing and desorbing lithium ions, and carbon nanofibers. The material capable of absorbing and desorbing lithium ions has a ratio A/B of a volume A in the charged state to a volume B in the discharged state of 1.2 or more. The first lithium salt is at least one selected from the group consisting of LiBF$_4$ and LiB(C$_2$O$_4$)$_2$. The second lithium salt is a salt other than the first lithium salt. The first lithium salt is included in the non-aqueous electrolyte at a weight ratio of 10$^{-4}$ or more relative to the carbon nanofibers. The first lithium salt included in the non-aqueous electrolyte has a concentration of 0.05 mol/dm$^3$ or less.

During the first charge, a coating membrane derived from at least one selected from the group consisting of LiBF$_4$ and LiB(C$_2$O$_4$)$_2$ included in the non-aqueous electrolyte is formed on the surface of the carbon nanofibers at an earlier stage than a coating membrane derived from the non-aqueous solvent in the non-aqueous electrolyte. This inhibits the subsequent formation of the coating membrane derived from the non-aqueous solvent in the non-aqueous electrolyte. As such, the inclusion of carbon nanofibers in the negative electrode increases the number of contact points between the carbon nanofibers and the active material particles, and space is created between the carbon nanofibers by the entanglement of the carbon nanofibers. The space absorbs or relieves the stress produced during expansion of the negative electrode active material. For this reason, despite the use of a high capacity negative electrode active material having a large volume expansion rate during charge and discharge, the current-collecting ability between the negative electrode material mixture and the negative electrode current collector during charge-discharge cycling can be maintained. In addition, as described above, since the formation of a coating membrane derived from the non-aqueous solvent can be inhibited, the deterioration in the cycle characteristics of the battery can be suppressed. Therefore, according to the present invention, it is possible to improve the cycle characteristics of a non-aqueous electrolyte secondary battery including a negative electrode active material having a large volume expansion rate.

Examples of the material capable of absorbing and desorbing lithium ions that functions as the negative electrode active material include, for example, a simple substance of element capable of forming an alloy with Li and capable of absorbing a large amount of Li, such as Si and Sn, and a material containing Si or Sn. Examples of the material containing Si or Sn include various materials, for example, an oxide such as $SiO_x$ ($0<x<2$) and $SnO_y$ ($0<y\leq2$), an alloy containing a transition metal element such as a Ni—Si alloy, a Ti—Si alloy, a Mg—Sn alloy, and a Fe—Sn alloy.

These materials may be used alone or in combination of two or more.

The carbon nanofibers as used herein mean a fibrous carbon material, the fiber diameter of which is 1 μm or less. Typical carbon fibers, for example, have a fiber diameter of greater than 1 μm. Therefore, the carbon nanofibers and the typical carbon fibers are different in fiber diameter and specific surface area. Since the fiber diameter of the carbon nanofibers is small, the number of fibers included in the carbon nanofibers is greater than that in the same weight of carbon fibers. Since the specific surface area of the carbon nanofibers is larger than that of the carbon fibers, the contact points between the carbon nanofiber and the active material is larger in number. For this reason, the carbon nanofibers are excellent in maintaining the current-collecting ability as compared with the carbon fibers.

Further, the carbon fibers are large in fiber diameter and rigid, and therefore, have difficulty in exerting a function of relieving the stress produced during expansion of the active material. In contrast, the carbon nanofibers are small in fiber diameter and entangled with one another. As such, space is created between the carbon nanofibers by the entanglement. The space and the elasticity of the carbon nanofibers themselves allow the carbon nanofibers to exert a function of relieving the stress produced during expansion of the negative electrode active material.

No particular limitation is imposed on the form of the carbon nanofibers. For example, carbon nanofibers in the form of tube-like fibers, accordion-like fibers, plate-like fibers, or herringbone-like fibers may be used. The negative electrode may include only one of the foregoing forms of carbon nanofibers or alternatively may include two or more different forms of carbon nanofibers. Further, the carbon nanofibers may be in the form other than the foregoing forms.

The fiber diameter of the carbon nanofibers is preferably 1 nm to 1 μm, and more preferably 50 nm to 300 nm. If the fiber diameter of the carbon nanofibers is smaller than 1 nm, the synthesis thereof becomes extremely difficult, and consequently the productivity may be reduced. If the fiber diameter thereof is greater than 1 μm, it may be impossible to maintain the current-collecting ability in the case of using an active material having a large expansion rate.

The fiber length of the carbon nanofibers is preferably 1 nm to 1 mm, and more preferably 500 nm to 100 μm. If the fiber length of the carbon nanofibers is shorter than 1 nm, the effect of improving the conductivity of the negative electrode and the effect of absorbing the stress produced during expansion of the active material may be reduced. If the fiber length of the carbon nanofibers is longer than 1 mm, the active material density in the negative electrode is reduced, and consequently a negative electrode having a high energy density may not be obtained.

The fiber length and the fiber diameter of the carbon nanofibers can be measured, for example, with a scanning electron microscope (SEM). The fiber length and the fiber diameter can be determined, for example, in the following manner. The length of any 20 to 100 carbon nanofibers and the diameter thereof are measured. The average length and average diameter obtained from the measured values can be referred to as the fiber length and the fiber diameter, respectively.

The ratio of the carbon nanofibers in the negative electrode material mixture is preferably 5 to 40% by weight, and more preferably 10 to 30% by weight. If the ratio of the carbon nanofibers is less than 5% by weight of the negative electrode material mixture, it is impossible to maintain the current-collecting ability of the negative electrode material mixture. If the ratio of the carbon nanofibers is more than 40% by weight, it is impossible to provide a negative electrode having a sufficient capacity.

In the present invention, it is preferable that the carbon nanofibers are bonded to a surface of the material capable of absorbing and desorbing lithium ions, and in addition, a catalyst element for promoting the growth of the carbon nanofibers is carried on the surface of the material capable of absorbing and desorbing lithium ions.

It is preferable that the carbon nanofibers are directly bonded to the surface of the material capable of absorbing and desorbing lithium ions. In other words, it is preferable that the bonding points between the carbon nanofibers and the material capable of absorbing and desorbing lithium ions, a constituent element of the material capable of absorbing and desorbing lithium ions and the constituent carbon of the carbon nanofibers form a compound.

It is preferable that the carbon nanofibers are bonded to the surface of the material capable of absorbing and desorbing lithium ions such that at least one end of each fiber is bonded to the surface. It is more preferable that the carbon nanofibers are bonded to the surface of the material capable of absorbing and desorbing lithium ions such that only one end of each fiber is bonded to the surface.

The "bond" as used herein includes a chemical bond and a physical bond between a constituent element of the material capable of absorbing and desorbing lithium ions and the constituent carbon of the carbon nanofibers, but does not include a bond formed via a resin component. The chemical bond includes an ionic bond, a covalent bond, and the like; and the physical bond includes a bond formed by intermolecular force, and the like.

In the case where the carbon nanofibers are not carried on the surface of the active material, repeated expansion and contraction of the active material due to charge and discharge readily create a gap between the active material and the carbon nanofibers although the gap may be a slight gap. When this occurs, the current-collecting ability is reduced. Further, since the carbon nanofibers are not bonded to the surface of the active material, a coating membrane is readily formed on the active material surface by the side reaction between the active material and the non-aqueous electrolyte. The coating membrane formed on the active material surface causes the electron conductivity to be lowered and the current-collecting ability to be reduced. In contrast, when the carbon nanofibers are carried on the surface of the material capable of absorbing and desorbing lithium ions, the reduction in the current-collecting ability as described above can be suppressed. Therefore, the effect obtained by adding the first lithium salt to the non-aqueous electrolyte becomes more effective.

Examples of the catalyst element for promoting the growth of the carbon nanofibers include, without any particular limitation, Mn, Fe, Co, Ni, Cu, Mo, and the like. These catalyst elements may be used alone or used in combination of two or more.

It is preferable that the ratio of the carbon nanofibers is 10 to 50% by weight of the total of the material capable of absorbing and desorbing lithium ions, the catalyst element, and the carbon nanofibers, and more preferably 20% by weight to 40% by weight. If the ratio of the carbon nanofibers is less than 5% by weight, the effect of improving the electric conductivity between the active material particles and absorbing the stress produced during expansion of the active material may be lowered. If the ratio of the carbon nanofibers is more than 50% by weight, the active material density in the negative electrode may be reduced.

Next, one exemplary method of forming carbon nanofibers on a surface of the material capable of absorbing and desorbing lithium ions is described.

A sufficient growth of carbon nanofibers is not observed without the presence of a catalyst. For this reason, it is necessary to allow the catalyst element to be carried on the material capable of absorbing and desorbing lithium ions.

The catalyst element to be carried on the material capable of absorbing and desorbing lithium ions may be in a metallic state or in a compound (e.g., oxide) state. In the case where the catalyst element is in a metallic state, the catalyst element may be an elementary metal or an alloy with another element. In the case where the catalyst element forms an alloy, the alloy may be an alloy of the above listed catalyst elements or an alloy of one or more of the foregoing catalyst elements and a metallic element other than these. The catalyst elements in different states may be carried on the surface of the material capable of absorbing and desorbing lithium ions.

It is preferable that the catalyst element is present on the surface of the material capable of absorbing and desorbing lithium ions in a particulate state.

Examples of the method of allowing the catalyst element to be carried include, without any particular limitation, for example, a method of allowing a simple substance of the catalyst element to be carried, a method of allowing a compound containing the catalyst element to be carried, and the like. The method of allowing a compound containing the catalyst element to be carried is easier than the method of allowing a simple substance of the catalyst element to be carried.

In the method of allowing a compound containing the catalyst element to be carried, the catalyst element is desirably maintained in a metallic state until the growth of carbon nanofibers is completed. For this reason, in this method, immediately before starting the growth of carbon nanofibers, the compound containing the catalyst element is reduced, so that the catalyst element is rendered in a metallic state.

As the compound containing the catalyst element, for example, an oxide, a carbide, and a nitrate may be used without any particular limitation. Among these, a nitrate is preferably used. Examples of the nitrate include nickel nitrate hexahydrate, cobalt nitrate hexahydrate, iron nitrate nonahydrate, copper nitrate trihydrate, manganese nitrate hexahydrate, hexaammonium heptamolybdate tetrahydrate, and the like. Among these, nickel nitrate and cobalt nitrate are preferred.

The formation of carbon nanofibers on a surface of a material capable of absorbing and desorbing lithium ions can be carried out, for example, in the following manner.

For example, the material capable of absorbing and desorbing lithium ions on which a compound containing the catalyst element is allowed to be carried is fed into a ceramic reaction vessel, and the temperature is raised in an inert gas or a gas having a reducing ability to a predetermined heating temperature. After the temperature is raised to the predetermined heating temperature, while a raw material gas to serve as a raw material of carbon nanofibers is introduced into the reaction vessel, the carbon nanofibers are grown on the surface of the material capable of absorbing and desorbing lithium ions over a time period of, for example, one minute to five hours.

Here, the heating temperature is preferably 100 to 1000° C., and more preferably 300 to 700° C. A heating temperature of lower than 100° C. prevents the growth of the carbon nanofibers or slows the growth thereof, and consequently the productivity may be reduced. A heating temperature exceeding 1000° C. promotes the decomposition of the raw material gas, and the carbon nanofibers may be hard to grow.

As the raw material gas, a mixed gas of a carbon-containing gas and hydrogen gas is suitably used. As the carbon-containing gas, for example, methane, ethane, ethylene, butane, acetylene, and carbon monoxide may be used. The mixing ratio of the carbon-containing gas and hydrogen gas is preferably 0.2:0.8 to 0.8:0.2 in molar ratio (volume ratio).

The compound containing the catalyst element is reduced while the temperature is raised in an inert gas or a gas having a reducing ability to a predetermined heating temperature, so that the catalyst element is rendered in a metallic state. Here, in the case where the catalyst element in a metallic state does not appear on the surface of the material capable of absorbing and desorbing lithium ions in the process of raising the temperature, the ratio of the hydrogen gas included in the raw material gas should be increased.

In such a manner as described above, the reduction of a compound including the catalyst element to the catalyst element and the growth of carbon nanofibers are allowed to proceed in parallel.

The non-aqueous electrolyte includes at least a non-aqueous solvent and a first lithium salt and a second lithium salt dissolved in the non-aqueous solvent.

The first lithium salt is at least one selected from the group consisting of $LiBF_4$ and $LiB(C_2O_4)_2$. The lower limit of the content of the first lithium salt contained in the non-aqueous electrolyte is defined, in view of inhibiting the side reaction that occurs on the surface of the carbon nanofibers, as a weight ratio of the first lithium salt to the carbon nanofibers. The weight ratio is $10^{-4}$. The upper limit of the content of the first lithium salt is defined, in view of maintaining the electric conductivity of the non-aqueous electrolyte in order to provide excellent rate characteristics, as a concentration of the first lithium salt in the non-aqueous electrolyte. The concentration of the first lithium salt in the non-aqueous electrolyte is 0.05 mol/dm$^3$ or less, and preferably 0.01 mol/dm$^3$ or less.

In the case where the non-aqueous electrolyte includes both $LiBF_4$ and $LiB(C_2O_4)_2$, the weight ratio of the total of $LiBF_4$ and $LiB(C_2O_4)_2$ to the carbon nanofibers is $10^{-4}$ or more, and the concentration of the total of these is 0.05 mol/dm$^3$ or less.

When the weight ratio of the first lithium salt to the CNFs is within this range, a stable coating membrane derived from the first lithium salt is formed on the surface of the carbon nanofibers, inhibiting the side reaction between the carbon nanofibers and the non-aqueous solvent. This improves the cycle characteristics of the battery. If the weight ratio of the first lithium salt to the carbon nanofibers is less than $10^{-4}$, the effect of inhibiting the formation of a coating membrane made of a decomposition product derived from the non-aqueous solvent becomes insufficient. If the concentration of the first lithium salt in the non-aqueous electrolyte is higher than 0.05 mol/dm$^3$, the thickness of the coating membrane derived from the first lithium salt is increased, and the stress produced during expansion of the negative electrode active material cannot be readily absorbed and/or relieved. Moreover, there may be a case where a coating membrane having an excessively high resistance is formed. In another case, the non-aqueous electrolyte becomes more viscous, and the lithium ion conductivity of the non-aqueous electrolyte may be lowered. This deteriorates the rate characteristics of the battery.

As the second lithium salt, a lithium salt other than the foregoing first lithium salt, namely, a lithium salt other than $LiBF_4$ and $LiB(C_2O_4)_2$ is used. Examples of the second lithium salt may include $LiPF_6$; $LiAsF_6$; lithium perfluoroalkyl sulfonyl imides, such as $LiN(CF_3SO_2)_2$, $LiN(C_4F_9SO_2)_2$, and $LiN (CF_3SO_2)(C_4F_9SO_2)$; and lithium perfluoroalkyl sulfonyl methides, such as $LiC(CF_3SO_2)_2$. These may used alone or in combination of two or more.

As the non-aqueous solvent, a solvent commonly used in the art may be used without any particular limitation. As the non-aqueous solvent, it is possible to use an aprotic organic solvent, for example, a cyclic ether, such as ethylene carbonate, propylene carbonate, and butylenes carbonate; a cyclic carboxylic acid ester, such as γ-butyrolactone, γ-valerolactone, and furanone; a chain carbonate, such as diethyl carbonate, ethyl methyl carbonate, and dimethyl carbonate; a chain ether, such as 1,2-methoxyethane, 1,2-ethoxyethane, and ethoxy methoxy ethane; a cyclic ether, such as tetrahydrofuran, and 1,2-methyl tetrahydrofuran. These may be used alone or in combination of two or more.

It should be noted that, as long as the effects of the present invention are not impaired, a cyclic carbonate, a cyclic carboxylic acid ester, a chain carbonate, and the like in which the hydrocarbon group is partially replaced with a halogen element such as fluorine may be used as the non-aqueous solvent.

The non-aqueous electrolyte may be in the form of liquid or in the form of gel.

In the case where the non-aqueous electrolyte is in the form of gel, the non-aqueous electrolyte may be composed of, for example, a polymer compound, and a solution prepared by dissolving the first lithium salt and the second lithium salt in the non-aqueous solvent. As the polymer compound, for example, an ether-type polymer compound, such as polyethylene oxide or a cross-linked material containing polyethylene oxide; an ester-type polymer compound or an acrylate-type polymer compound, such as polymethacrylate; a fluorocarbon-type polymer compound, such as polyvinylidene fluoride or a copolymer of vinylidene fluoride and hexafluoropropylene may be used. These polymer compounds may be used alone or in combination of two or more.

In the case of using the non-aqueous electrolyte in the form of gel, the non-aqueous electrolyte in the form of gel may be disposed between the positive electrode and the negative electrode in place of the separator. Alternatively, the non-aqueous electrolyte in the form of gel may be disposed so as to be adjacent to the separator.

EXAMPLES

Example 1

(Batteries 1 to 6)

(i) Preparation of Negative Electrode Active Material (Negative Electrode Active Material a-1)

99 parts by weight of SiO powder (available from Wako Pure Chemical Industries, Ltd.) prepared by grounding and classifying beforehand so as to have a mean particle size of 10 μm and a solution prepared by dissolving 1 part by weight of nickel nitrate (II) hexahydrate (guaranteed reagent available from Kanto Chemical Co., Inc.) in deionized water were mixed. The resultant mixture was stirred for one hour, and then, water in the mixture was removed with an evaporator, to allow nickel nitrate to be carried on the surface of the SiO particles.

Thereafter, the SiO particles with nickel nitrate carried thereon were fed into a ceramic reaction vessel, and the temperature was raised in the presence of helium gas to 550° C. In this process, nickel nitrate (II) was reduced to elementary Ni.

Subsequently, the helium gas was replaced with a mixed gas composed of 50% by volume of hydrogen gas and 50% by volume of methane gas. Thereafter, in the mixed gas, the SiO particles were held at 550° C. for 10 minutes, to allow carbon nanofibers (CNFs) to grow on the surface of the SiO particles.

Thereafter, the mixed gas was replaced with helium gas and the interior of the reaction vessel was cooled to room temperature, whereby a negative electrode active material a-1 was obtained. The mean fiber diameter of the CNFs formed on the surface of the SiO particles was 80 nm, and the mean fiber diameter thereof was 70 μm.

From the change in weight before and after the treatment, the ratio of the CNFs in the negative electrode active material a-1 was 21% by weight of the total of SiO, CNFs, and elementary Ni.

The ratio of a volume A in the charged state to a volume B in the discharged state of the SiO particles serving as the material capable of absorbing and desorbing lithium ions was 1.6. Here, the charged state was a state in which the potential was 90 mV versus $Li/Li^+$, and the discharged state was a state in which the potential was 450 mV versus $Li/Li^+$.

(Negative Electrode Active Material a-2)

Commercially available Ti powder and Sn powder were used as starting materials to synthesize a Ti—Sn alloy in nitrogen atmosphere by a mechanical alloying method. In the synthesized Ti—Sn alloy, Ti was 50% by weight and Sn was 50% by weight. The analysis of the synthesized alloy by X-ray diffractometry showed that the alloy included two phases, i.e., a Sn phase and a TiN phase.

The Ti—Sn alloy was classified to obtain particles having a mean particle size of 10 μm.

A negative electrode active material a-2 was prepared in the same manner as the negative electrode active material a-1 except that such a Ti—Sn alloy was used. The mean fiber diameter of the CNFs formed on the surface of the Ti—Sn alloy was 100 nm, and the mean fiber length was 20 μm.

In the negative electrode active material a-2, the ratio of the CNFs was 23% by weight of the total of the Ti—Sn alloy, CNFs, and elementary Ni.

The ratio of a volume in the charged state to a volume in the discharged state of the Ti—Sn alloy serving as the material capable of absorbing and desorbing lithium ions was 2.0. Here, the charged state was a state in which the potential was 90 mV versus $Li/Li^+$, and the discharged state was a state in which the potential was 450 mV versus $Li/Li^+$.

(Negative Electrode Active Material a-3)

A Ti—Si alloy prepared by a melting method was used as a starting material to synthesize a material capable of absorbing and desorbing lithium ions (Ti—Si alloy) in argon atmosphere by a mechanical alloying method. In the synthesized material, Ti was 9% by weight and Si was 91% by weight. The analysis of the synthesized material by electron-beam diffractometry using a transmission electron microscope showed that the material included two phases, i.e., a $TiSi_2$ phase and a Si phase.

The synthesized material was classified to obtain a Ti—Si alloy having a mean particle size of 10 μm.

A negative electrode active material a-3 was prepared in the same manner as the negative electrode active material a-1 except that such a Ti—Si alloy was used. The mean fiber diameter of the CNFs formed on the surface of the Ti—Si alloy was 50 nm, and the mean fiber length was 50 μm.

In the negative electrode active material a-3, the ratio of the CNFs was 23% by weight of the total of the Ti—Si alloy, CNFs, and elementary Ni.

The ratio of a volume in the charged state to a volume in the discharged state of the Ti—Si alloy serving as the material capable of absorbing and desorbing lithium ions was 3.5. Here, the charged state was a state in which the potential was 90 mV versus $Li/Li^+$, and the discharged state was a state in which the potential was 465 mV versus $Li/Li^+$.

(ii) Formation of Negative Electrode

To 80 parts by weight of the negative electrode active material a-1 prepared as described above, an aqueous polyacrylic acid solution (available from Wako Pure Chemical Industries, Ltd., polyacrylic acid weight: 25%) serving as a binder was added such that the weight of polyacrylic acid was 20 parts by weight. Subsequently, the resultant mixture was kneaded while an appropriate amount of pure water was added thereto, thereby to prepare a paste for negative electrode material mixture. The paste for negative electrode material mixture thus prepared was applied onto both faces of a current collector made of a copper foil (thickness: 10 μm), rolled, and dried. A negative electrode a-11 including a current collector with a material mixture layer carried on each of both faces thereof was thus obtained. Here, the amount of CNFs was 19% by weight of the negative electrode material mixture layers.

Negative electrodes a-21 and a-31 were formed in the same manner as the negative electrode a-11 except that the negative electrode active material a-2 or a-3 was used. In the negative electrode a-21, the amount of CNFs was 21% by weight of the negative electrode material mixture layers. In negative electrode a-31, the amount of CNFs was 21% by weight of the negative electrode material mixture layers.

(iii) Formation of Positive Electrode 95 parts by weight of $LiNi_{0.85}Co_{0.15}O_2$ powder serving as a positive electrode active material and 2 parts by weight of acetylene black serving as a conductive agent were mixed. To the resultant powder, an N-methyl-2-pyrrolidone (NMP) solution of polyvinyl fluoride (PVDF) serving as a binder (#1320 available from Kureha Corporation) was added such that the weight of PVDF was 3 parts by weight. To the resultant mixture, an appropriate amount of NMP was added, thereby to prepare a paste for positive electrode material mixture. The paste for positive electrode material mixture thus prepared was applied onto both faces of a current collector made of an aluminum foil (thickness: 15 μm) by a doctor blade method, rolled to have an appropriate thickness, and sufficiently dried at 85° C. The positive electrode was thus obtained.

(iv) Preparation of Non-Aqueous Electrolyte

In a mixture of non-aqueous solvents including ethylene carbonate, dimethyl carbonate, and ethyl methyl carbonate in a volume ratio of 1:2:3, $LiPF_6$ was dissolved at a concentration of 1 mol/L, whereby a non-aqueous electrolyte b-0 was obtained.

In the non-aqueous electrolyte b-0, $LiBF_4$ serving as the first lithium salt was dissolved at a predetermined concentration, whereby a non-aqueous electrolyte b-11 was obtained.

Likewise, in the non-aqueous electrolyte b-0, $LiB(C_2O_4)_2$ serving as the first lithium salt was dissolved at a predetermined concentration, whereby a non-aqueous electrolyte b-21 was obtained.

(v) Fabrication of Cylindrical Battery

A cylindrical battery as shown in FIG. 1 was fabricated.

First, to a positive electrode 1, one end of a positive electrode lead 8 made of aluminum was attached by ultrasonic welding. Likewise, to a negative electrode 2, one end of a negative electrode lead 9 made of copper was attached. Thereafter, the positive electrode 1 and the negative electrode 2 with the lead attached thereto were wound with a strip-shaped microporous separator 3 made of polyethylene having a larger width than the both electrode plates interposed therebetween into a cylindrical shape, thereby to form an electrode plate assembly 4. To the upper and lower sides of the electrode plate assembly 4, insulating rings 10 and 11 made of polypropylene were placed, respectively. The electrode plate assembly with the insulating rings was inserted into a battery case 5.

The other end of the positive electrode lead 8 was welded to a sealing plate 6, and the other end of the negative electrode lead 9 was welded to the bottom of the battery case 5. Subsequently, the non-aqueous electrolyte prepared in the manner as described above was injected into the battery case 5. Thereafter, the opening end of the battery case 5 was crimped onto the sealing plate 6 with a gasket 7 interposed therebetween to finish a non-aqueous electrolyte battery. The diameter of the obtained battery was 18 mm, and the total height was 65 mm.

In this Example, batteries fabricated by using the negative electrodes a-11 to a-31 and using the non-aqueous electrolyte b-11 were referred to as Batteries 1 to 3; and batteries fabricated by using the negative electrodes a-11 to a-31 and using the non-aqueous electrolyte b-21 were referred to as Batteries 4 to 6.

In the batteries thus fabricated, the weight ratio of $LiBF_4$ or $LiB(C_2O_4)_2$ included in the non-aqueous electrolyte to the CNFs included in the negative electrode was $1\times10^{-2}$.

The design capacities of the batteries thus fabricated were 2650 mAh in the batteries including the negative electrode a-11, 2450 mAh in the batteries including the negative electrode a-21, and 2750 mAh in the batteries including the negative electrode a-31.

(Comparative Batteries A to C)

Batteries fabricated by using the negative electrodes a-11 to a-31 and using the non-aqueous electrolyte b-0 were referred to as Comparative Batteries A to C.

(Comparative Battery D)

A battery fabricated by using a negative electrode prepared in the manner as described below including an artificial graphite as the negative electrode active material and using the non-aqueous electrolyte b-11 was referred to as Comparative Battery D. The design capacity of Comparative Battery D was 2200 mAh.

A method of forming the negative electrode is described below.

95 parts by weight of artificial graphite (KS-44 available from Timcal Ltd.), 3 parts by weight of styrene-butadiene rubber (SBR) serving as a binder, 1 part by weight of carboxymethyl cellulose (CMC) (available from Dai-ichi Kogyo Seiyaku Co., Ltd.) serving as a thickener, and an appropriate amount of water were mixed with a planetary mixer to prepare a paste for negative electrode material mixture. This paste was applied onto both faces of a current collector made of a copper foil (thickness: 10 μm), dried, and rolled. The negative electrode was thus obtained.

The ratio of a volume in the charged state to a volume in the discharged state of the artificial graphite was 1.1. Here, the charged state was a state in which the potential was 80 mV versus Li/Li$^+$, and the discharged state was a state in which the potential was 450 mV versus Li/Li$^+$.

(Comparative Battery E)

A negative electrode a-01 was formed by using the SiO powder as included in the negative electrode active material a-1 and carbon fibers (Melblon 3100 available from Petoca Materials Ltd. LTD) in the same manner as the negative electrode a-11. The amount of carbon fibers was 21% by weight of the total of the SiO powder and the carbon fibers. The fiber diameter of the carbon fibers was 9 µm, and the fiber length was 30 µm.

Comparative Battery E was fabricated in the same manner as Battery 1 except that the negative electrode a-01 was used and the non-aqueous electrolyte b-11 was used. In the negative electrode a-01 also, the amount of carbon fibers was 19% by weight of the negative electrode material mixture layers. The design capacity of Comparative Battery E was 2600 mAh.

(Evaluation)

These Batteries 1 to 6 and Comparative Batteries A to E were subjected to predetermined preliminarily charge and discharge. Thereafter, the battery capacity and the capacity retention rate were measured in the following manner.

(Measurement of Battery Capacity)

Each of the batteries was charged and discharged at 25° C. under the following conditions.

Each of the batteries was charged at a constant current of 0.7 C hour rate until the battery voltage reached 4.2 V, and subsequently charged at a constant voltage of 4.2 V until the current reduced to a value of 0.05 C hour rate. After allowed to stand for 30 minutes, the charged battery was discharged at a current value of 0.2 C hour rate until the battery voltage was reduced to 2.5 V. The discharge capacity at this time was referred to as a battery capacity. The results are shown in Table 1.

(Measurement of Capacity Retention Rate)

Each of the batteries was charged and discharged at 25° C. under the following conditions.

Each of the batteries was charged at a constant current of 0.5 C hour rate until the battery voltage reached 4.2 V, and subsequently charged at a constant voltage of 4.2 V until the charged current reduced to a current value of 0.05 C hour rate. After allowed to stand for 30 minutes, the charged battery was discharged at a current value of 1.0 C hour rate until the battery voltage was reduced to 2.5 V. After the discharge, the battery was allowed to stand for 30 minutes. This charge-discharge cycle was performed 100 times in total. The ratio of a discharge capacity at the 100th cycle to a discharge capacity at the 1st cycle expressed as a percentage was referred to as a capacity retention rate (%). A capacity retention rate closer to 100 indicates that the battery has a better cycle life. The results are shown in Table 1. The types of the negative electrode and the non-aqueous electrolyte, the battery capacity, and the concentration of the first lithium salt in the non-aqueous electrolyte are also shown in Table 1.

TABLE 1

| | Negative electrode | Non-aqueous electrolyte | Concentration of first lithium salt (mol/dm$^3$) | Battery capacity (mAh) | Capacity retention rate (%) |
|---|---|---|---|---|---|
| Battery 1 | a-11 | b-11 | $1.0 \times 10^{-2}$ | 2633 | 83 |
| Battery 2 | a-21 | b-11 | $1.0 \times 10^{-2}$ | 2432 | 82 |
| Battery 3 | a-31 | b-11 | $1.0 \times 10^{-2}$ | 2755 | 79 |
| Battery 4 | a-11 | b-21 | $5.0 \times 10^{-3}$ | 2635 | 82 |
| Battery 5 | a-21 | b-21 | $5.0 \times 10^{-3}$ | 2433 | 81 |
| Battery 6 | a-31 | b-21 | $5.0 \times 10^{-3}$ | 2760 | 80 |
| Comparative Battery A | a-11 | b-0 | — | 2635 | 43 |
| Comparative Battery B | a-21 | b-0 | — | 2430 | 40 |
| Comparative Battery C | a-31 | b-0 | — | 2745 | 23 |
| Comparative Battery D | Graphite | b-11 | $1.2 \times 10^{-2}$ | 2225 | 92 |
| Comparative Battery E | a-01 | b-11 | $1.0 \times 10^{-2}$ | 2596 | 34 |

From Table 1, in Batteries 1 to 6, the battery capacity and the capacity retention rate were remarkably improved as compared with in Comparative Batteries A to E.

In Comparative Battery E including the negative electrode a-01 obtained by using the SiO powder and the carbon fibers in combination, the capacity retention rate was significantly reduced. This was presumably because the carbon fibers used as the conductive agent could not sufficiently relieve the stress produced during expansion since they were large in diameter and rigid.

Example 2

Non-aqueous electrolytes b-12 to b-17 were prepared by dissolving LiBF$_4$ in the non-aqueous electrolyte b-0 such that the ratio of the LiBF$_4$ to the CNFs was $1.0\times10^{-5}$, $1.0\times10^{-4}$, $1.0\times10^{-3}$, $1.0\times10^{-2}$, $5.0\times10^{-2}$ or $1.0\times10^{-1}$.

Likewise, non-aqueous electrolytes b-22 to b-27 were prepared by dissolving LiB(C$_2$O$_4$)$_2$ in the non-aqueous electrolyte b-0 such that the ratio of the LiB(C$_2$O$_4$)$_2$ to the CNFs was $1.0\times10^{-5}$, $1.0\times10^{-4}$, $1.0\times10^{-3}$, $1.0\times10^{-2}$, $1.0\times10^{-1}$ or 10.

Further, a non-aqueous electrolyte b-28 was prepared by dissolving LiBF$_4$ and LiB(C$_2$O$_4$)$_2$ in the non-aqueous electrolyte b-0 such that the ratio of the LiBF$_4$ to the CNFs was $1.0\times10^{-2}$ and the ratio of the LiB(C$_2$O$_4$)$_2$ to the CNFs was $1.0\times10^{-2}$.

Batteries 7 to 19 were fabricated in the same manner as Battery 1 except that the negative electrode a-11 was used and the non-aqueous electrolytes b-12 to b-17, b-22 to b-27, and b-28 were used. Batteries 7, 12, 13, and 18 were comparative batteries. The design capacities of these batteries ware 2650 mAh.

With respect to Batteries 7 to 19, the capacity retention rate was determined in the same manner as in Example 1. The results are shown in Table 2. The types of the negative electrode and the non-aqueous electrolyte, the concentration of the first lithium salt in the non-aqueous electrolyte, and the weight ratio of the first lithium salt to the CNFs are also shown in Table 2.

TABLE 2

| | Negative electrode | Non-aqueous electrolyte | Concentration of first lithium salt (mol/dm$^3$) | Weight ratio of first lithium salt to CNFs | | Capacity retention rate (%) |
|---|---|---|---|---|---|---|
| | | | | LiBF$_4$ | LiB(C$_2$O$_4$)$_2$ | |
| Comparative Battery 7 | a-11 | b-12 | $1.0 \times 10^{-5}$ | $1.0 \times 10^{-5}$ | — | 55 |
| Battery 8 | a-11 | b-13 | $1.0 \times 10^{-4}$ | $1.0 \times 10^{-4}$ | — | 75 |
| Battery 9 | a-11 | b-14 | $1.0 \times 10^{-3}$ | $1.0 \times 10^{-3}$ | — | 80 |
| Battery 10 | a-11 | b-15 | $1.0 \times 10^{-2}$ | $1.0 \times 10^{-2}$ | — | 82 |
| Battery 11 | a-11 | b-16 | $5.0 \times 10^{-2}$ | $5.0 \times 10^{-2}$ | — | 81 |
| Comparative Battery 12 | a-11 | b-17 | $1.0 \times 10^{-1}$ | $1.0 \times 10^{-1}$ | — | 60 |
| Comparative Battery 13 | a-11 | b-22 | $5.0 \times 10^{-6}$ | — | $1.0 \times 10^{-5}$ | 53 |
| Battery 14 | a-11 | b-23 | $5.0 \times 10^{-5}$ | — | $1.0 \times 10^{-4}$ | 76 |
| Battery 15 | a-11 | b-24 | $5.0 \times 10^{-4}$ | — | $1.0 \times 10^{-3}$ | 82 |
| Battery 16 | a-11 | b-25 | $5.0 \times 10^{-3}$ | — | $1.0 \times 10^{-2}$ | 84 |
| Battery 17 | a-11 | b-26 | $5.0 \times 10^{-2}$ | — | $1.0 \times 10^{-1}$ | 81 |
| Comparative Battery 18 | a-11 | b-27 | $5.0 \times 10^{-1}$ | — | 10 | 59 |
| Battery 19 | a-11 | b-28 | $1.5 \times 10^{-2}$ | $1.0 \times 10^{-2}$ | $1.0 \times 10^{-2}$ | 85 |

From Table 2, in Comparative Batteries 7 and 13 in which the weight ratio of the LiBF$_4$ or the LiB (C$_2$O$_4$)$_2$ to the CNFs was less than $10^{-4}$, and Comparative Batteries 12 and 18 in which the concentration of the first lithium salt was greater than 0.05 mol/dm$^3$, the capacity retention rate was significantly reduced. This indicates that the weight ratio of the first lithium salt to the carbon nanofibers should be $10^{-4}$ or more, and the concentration of the first lithium salt included in the non-aqueous electrolyte should be 0.05 mol/dm$^3$ or less.

The results of Battery 19 indicates that even in the case where the non-aqueous electrolyte includes both LiBF$_4$ and LiB(C$_2$O$_4$)$_2$ as the first lithium salt, as long as the amount thereof is within the foregoing range, the capacity retention rate can be maintained high.

Example 3

Batteries 20 to 27

Negative electrode active materials a-4 to a-11 were prepared in the same manner as the negative electrode active material a-1 except that the growth time of CNFs was controlled such that the amount of the CNFs in a total of the SiO, CNFs, and elementary Ni (hereinafter referred to as the weight ratio of CNFs) was 5% by weight, 10% by weight, 20% by weight, 25% by weight, 30% by weight, 40% by weight, 50% by weight or 60% by weight. Negative electrodes a-41 to a-111 were formed by using the negative electrode active materials a-4 to a-11 in the same manner as the negative electrode a-11.

The fiber diameters of the CNFs included in the negative electrode active materials a-4 to 11 were 80 nm, 80 nm, 80 nm, 80 nm, 80 nm, 80 nm, 80 nm, and 80 nm, respectively; and the fiber lengths were 20 µm, 20 µm, 70 µm, 100 µm, 120 µm, 120 µm, 150 µm, and 150 µm, respectively.

In the negative electrodes a-41 to a-111, the amounts of the CNFs in the negative electrode material mixture layers were 4.0% by weight, 8.0% by weight, 16% by weight, 20% by weight, 24% by weight, 32% by weight, 40% by weight, and 48% by weight, respectively.

Batteries 20 to 27 were fabricated in the same manner as Battery 1 except that the negative electrodes a-41 to a-111 were used and the non-aqueous electrolyte b-11 was used. The design capacities of Batteries 20 to 27 were 2800 mAh, 2700 mAh, 2580 mAh, 2500 mAh, 2500 mAh, 2450 mAh, 2350 mAh, and 2200 mAh, respectively.

With respect to these batteries, the battery capacity and the capacity retention rate were determined in the same manner as in Example 1. The results are shown in Table 3. The types of the negative electrode and the non-aqueous electrolyte, and the weight ratio of the CNFs are also shown in Table 3.

TABLE 3

| | Negative electrode | Non-aqueous electrolyte | Weight ratio of CNF (wt %) | Battery capacity (mAh) | Capacity retention rate (%) |
|---|---|---|---|---|---|
| Battery 20 | a-41 | b-11 | 5 | 2786 | 48 |
| Battery 21 | a-51 | b-11 | 10 | 2723 | 78 |
| Battery 22 | a-61 | b-11 | 20 | 2585 | 85 |
| Battery 23 | a-71 | b-11 | 25 | 2505 | 85 |
| Battery 24 | a-81 | b-11 | 30 | 2500 | 86 |
| Battery 25 | a-91 | b-11 | 40 | 2465 | 86 |
| Battery 26 | a-101 | b-11 | 50 | 2355 | 87 |
| Battery 27 | a-111 | b-11 | 60 | 2210 | 90 |

From Table 3, in Battery 20 in which the weight ratio of the CNFs was 5% by weight, the capacity retention rate was reduced. In Battery 27 in which the weight ratio of the CNFs was 60% by weight, the battery capacity was slightly reduced. This indicates that the weight ratio of the CNFs is preferably 10 to 50% by weight.

INDUSTRIAL APPLICABILITY

The non-aqueous electrolyte secondary battery of the present invention has a high capacity and excellent cycle characteristics, and therefore can be suitably used, for example, as a power source for portable equipment.

The invention claimed is:
1. A non-aqueous electrolyte secondary battery including: a positive electrode including a positive electrode material mixture; a negative electrode including a negative electrode material mixture; and a non-aqueous electrolyte including a non-aqueous solvent, and a first lithium salt and a second lithium salt dissolved in said non-aqueous solvent, wherein said negative electrode material mixture includes a material capable of absorbing and desorbing lithium ions, and carbon nanofibers, said material capable of absorbing and desorbing lithium ions has a ratio A/B of a volume A in a charged state to a volume B in a discharged state of 1.2 or more, said first lithium salt is at least one selected from the group consisting of $LiBF_4$ and $LiB(C_2O_4)_2$, said second lithium salt is a salt other than said first lithium salt, said first lithium salt is included in said non-aqueous electrolyte at a weight ratio of $10^{-4}$ or more relative to said carbon nanofibers, and said first lithium salt included in said non-aqueous electrolyte has a concentration of 0.05 $mol/dm^3$ or less.

2. The non-aqueous electrolyte secondary battery in accordance with claim 1, wherein said carbon nanofibers are carried on a surface of said material capable of absorbing and desorbing lithium ions, and a catalyst for promoting a growth of said carbon nanofibers is also carried on the surface of said material capable of absorbing and desorbing lithium ions.

3. The non-aqueous electrolyte secondary battery in accordance with claim 2, wherein a ratio of said carbon nanofibers to a total of said carbon nanofibers, said material capable of absorbing and desorbing lithium ions, and said catalyst is 10 to 50% by weight.

4. The non-aqueous electrolyte secondary battery in accordance with claim 1, wherein said material capable of absorbing and desorbing lithium ions contains at least one element selected from the group consisting of Si and Sn.

* * * * *